June 13, 1950            G. H. TOOPS            2,511,553
METHOD OF WELDING PRESSURE VESSELS
Filed Feb. 21, 1947
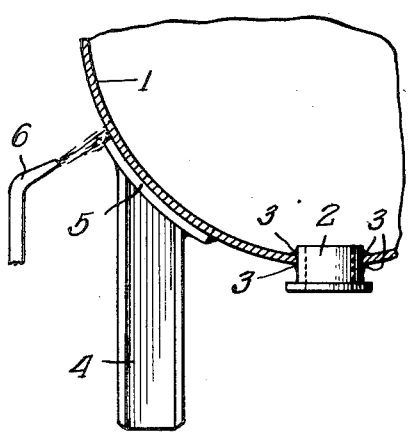
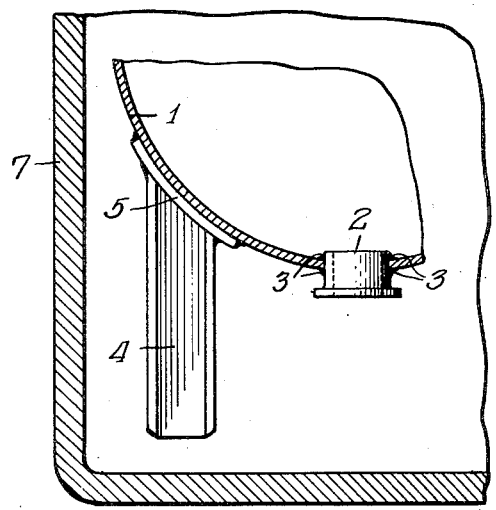
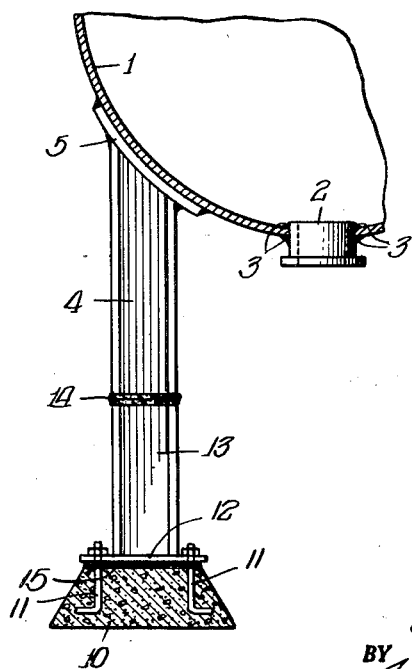
INVENTOR.
Glynn H. Toops,
BY George J. Haight Patented June 13, 1950

2,511,553

UNITED STATES PATENT OFFICE 2,511,553

METHOD OF WELDING PRESSURE VESSELS

Glynn H. Toops, Sharon, Pa., assignor to General American Transportation Corporation, Chicago, Ill., a corporation of New York Application February 21, 1947, Serial No. 730,032

4 Claims. (Cl. 113—112)

This invention relates to a method of welding pressure vessels and the like, and has for its principal object the provision of a new and improved method of this kind.

It is a main object of the invention to provide a method of welding supports on a vessel that results in stress-free welds on the vessel.

Another object of the invention is to provide a method of welding which combines shop and field welding with stress-relieving of critical shop-made welds.

Another object of the invention is to provide a new and improved method of erecting and welding a pressure vessel in place on a foundation so that the vessel is free from welding and erecting stresses.

Further objects of the invention not specifically mentioned here will be apparent from the detailed description and claims which follow, reference being had to the accompanying drawing in which Fig. 1 is a diagrammatic fragmentary view illustrating the method of welding supports on a vessel in the shop;

Fig. 2 is a fragmentary diagrammatic view illustrating the stress-relieving of such shop-made welds; and Fig. 3 is a diagrammatic fragmentary view illustrating the final welding of the vessel in place on the foundation.

Pressure vessels, such as tanks employed in the storing of volatile liquids or gases under pressure, must be free from locked-in stresses resulting from welding and strains produced during fabrication and erection of the vessel, if that vessel is to contain such material under pressure with safety over a long period of time. This is particularly true with relatively small tanks adapted to hold fluid or gas that must be maintained under relatively high pressure, for in such cases strains placed upon the tank by the pressures within it and the weight of the tank and material contained in it stress the tank shell severely; and if that shell is already stressed internally by welding or erecting stresses, failure is apt to result.

The present method seeks to produce a stress-free vessel for storing materials under high pressure by combining shop-welding with field-welding in such a manner that all welds likely to produce stresses in the shell of the tank or vessel are made in the shop so that these stresses may be relieved, as by heat treating. Welding necessary to secure the vessel in place on the foundation at the location of the vessel in the field is done at points removed from the critical shell of the vessel sufficiently far to preclude building up of any stresses in that shell by the field-welding operation.

In the prior art of which I am aware, pressure vessels have been fabricated in a shop and welding stresses therein relieved, this fabricating being carried to completion so that the vessel is complete and ready to be bolted to the foundation. A practice of this kind may result in locking into the shell of the vessel erecting stresses set up by misalignment of the foundation and consequent drawing or warping of the vessel shell as the supporting feet are drawn down tight onto the foundation. The method of the present invention guards against contingencies of this kind by shop-welding stub or fragmentary supporting members onto the vessel and placing complementary supporting members on the foundation. These foundation members are aligned so that their upper ends lie in a common horizontal plane; and when the supports on the shop-fabricated vessel are registered with these foundation supports and welded thereto, all possibility of warping or stressing the critical shell of the vessel is eliminated.

Referring now to the drawings in more detail, the shell 1 of the vessel may be cylindrical, spherical, or any other desired shape, and is composed of material having sufficient thickness to give it tensile strength capable of withstanding the pressures that the vessel is designed to handle. In the case of tanks for storing volatile liquids or gases, the material will ordinarily be steel. Fittings, such as 2, are welded into the shell 1 by suitable welds 3 as required, and stub supports 4 are registered with and welded to the shell at the required points. The supports 4 may be sections of a cylindrical pipe or structural members of I or H section, as required, and, if desired, a pressure foot 5 may be interposed between the end of the support member 4 and the shell 1 of the vessel. The particular shape of the support and its length are matters of design, and not of the essence of the present invention.

In the shop and as a part of the fabrication therein performed, the supports 4 or pressure feet 5 are welded to the shell 1 either by a flame-weld indicated by the nozzle and flame 6, or by an arc-weld, as desired.

After the vessel or a section of the vessel has been thus fabricated, it is placed in a suitable oven 7 diagrammatically illustrated in Fig. 2 and subjected to heat treatment that will relieve any stresses that may be locked in the shell by the welding of the fittings and supports thereto. The particular type of treatment employed to relieve the stresses is not of the essence of the present invention and will be determined by the requirements of the particular vessel and material of which it is made.

As will be seen in Fig. 3 at the location that the vessel or tank is to be erected, suitable bases 10, preferably composed of concrete, are located at such points that they will register with the stub supports 4 on the vessel. Embedded in the base 10 are anchor bolts 11 which are projected through suitable openings in a base plate 12 to permit bolting that plate to the base. Fixed upon the base plate 12 is a suitable foundation support 13 which is of the same design and size as the stub supports 4 on the vessel, although it may be of different length than the supports 4.

Each of the several bases 10 is equipped with base plates and supports, and prior to registering the tank therewith these supports are adjusted so that their upper ends 14 are all located in a common horizontal plane. If required to compensate for inaccuracies in the base 10, shims 15 may be interposed between the base 10 and base plate 12, so that when the bolts 11 are drawn down tight the upper end of the foundation support 13 will be positioned in this common horizontal plane.

When the foundation is thus prepared, the vessel and supports 4 are lowered onto it by suitable means, not shown, and each support 4 is accurately registered with and made to bear on the upper end 14 of the support 13. The stubs 4 are then secured to the supports 13 by welding along the line 14 to complete the erection of the tank.

Since the points of welding of the supports 13 and stubs 14 is remote from the shell 1 of the vessel, any stresses that are set up by this welding will be set up in the supports and not in the shell of the vessel. Since the upper ends 14 of the foundation support members 13 are all located in a common plane, no warping of the shell 1 of the vessel will occur. Should one of the supports 4 not be resting squarely on the base support 13, due to slight misalignment of that base support, an extra thick weld can be produced and the tank or vessel thus anchored in proper position without warping or straining that tank.

The method of the present invention possesses many advantages. Welds in the critical areas of the shell of the tank are all made in the shop where stresses thus built up in the shell can be relieved by suitable methods, such as heat treating. In the case of smaller tanks this stress-relieving can be done after the fabrication of the tank and attachment of supporting members thereto have been completed. In the case of larger tanks, the stress-relieving may have to be done a section at a time, and the stresses resulting from joining the sections together relieved by a separate operation. In the field, the tank is welded in place on the foundation and there are no strains placed upon it by this welding operation.

While I have chosen to illustrate and describe a preferred embodiment of my invention by showing its application to the welding of a pressure tank, I have done so by way of example only, as there are many modifications and adaptations which can be made by one skilled in the art within the teaching of the invention.

Having complied with the statutes and shown and described a preferred embodiment of my invention, what I consider new and desire to have protected by Letters Patent is pointed out in the appended claims.

What is claimed is:

1. The method of welding a pressure vessel in place upon a supporting foundation to eliminate welding stresses therein which comprises: shop-welding stub supports on the vessel, stress-relieving said welds, securing base members on the foundation, registering the ends of said stub supports remote from said vessel with said base members, and welding said remote ends to said base members.

2. The method of erecting a pressure vessel which has been shop-fabricated to include stub supports welded to the vessel and the welds treated to relieve stresses therein which comprises: constructing foundations positioned to register with said stub supports, placing base supports on said foundations, shimming said supports as necessary to locate the top surface thereof in a common horizontal plane, placing the vessel over the supports with the stub supports thereon registering with and resting on said base supports, and welding the stub supports to the base supports.

3. The method of making a pressure vessel which comprises: shop-forming the vessel, shop-welding supports and fittings to the vessel, heat-treating the vessel supports and fittings to relieve welding stresses therein, constructing foundations in situ, attaching base supports to said foundations, leveling said base supports to bring the upper ends thereof into a common horizontal plane, placing said vessel in place with said vessel supports in registration and engagement with said base supports, and welding said vessel supports to said base supports.

4. The method of erecting a presure vessel that is free from welding and erecting stresses which comprises: shop-forming the vessel; shop-welding supports and fittings to the vessel; treating the vessel, supports and fittings to relieve stresses therein; constructing foundations in situ; attaching base supports to said foundations; placing said vessel in place with the vessel supports in registration and engagement with said base supports; welding said vessel supports to said base supports by welds which may vary in thickness as required to eliminate erection stresses from said vessel and which are stressed in compression only by said vessel and contents of the vessel, vessel supports and fittings.

GLYNN H. TOOPS.

REFERENCES CITED

The following references are of record in the file of this patent:

UNITED STATES PATENTS

| Number | Name | Date |
| --- | --- | --- |
| 2,278,040 | Allen | Mar. 31, 1942 |
| 2,366,916 | Le Tourneau | Jan. 9, 1945 |
| 2,396,704 | Kerr | Mar. 19, 1946 |